United States Patent
Schack et al.

(10) Patent No.: US 11,260,861 B2
(45) Date of Patent: Mar. 1, 2022

(54) METHOD, DEVICE AND COMPUTER-READABLE STORAGE MEDIUM WITH INSTRUCTIONS FOR DETERMINING THE LATERAL POSITION OF A VEHICLE RELATIVE TO THE LANES ON A ROADWAY

(71) Applicant: Volkswagen Aktiengesellschaft, Wolfsburg (DE)

(72) Inventors: Moritz Schack, Braunschweig (DE); Markus Kerper, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 419 days.

(21) Appl. No.: 16/319,844

(22) PCT Filed: Jun. 13, 2017

(86) PCT No.: PCT/EP2017/064379
§ 371 (c)(1),
(2) Date: Jan. 23, 2019

(87) PCT Pub. No.: WO2018/019464
PCT Pub. Date: Feb. 1, 2018

(65) Prior Publication Data
US 2019/0263405 A1    Aug. 29, 2019

(30) Foreign Application Priority Data
Jul. 27, 2016  (DE) .................... 10 2016 213 782.4

(51) Int. Cl.
*G05D 1/02*   (2020.01)
*B60W 30/18*  (2012.01)
*G01C 21/36*  (2006.01)

(52) U.S. Cl.
CPC ......... *B60W 30/18* (2013.01); *G01C 21/3658* (2013.01); *G05D 1/0212* (2013.01);
(Continued)

(58) Field of Classification Search
CPC .............. B60W 30/18; B60W 2400/00; G01C 21/3658; G05D 1/0212; G05D 1/0246; G05D 2201/0213
(Continued)

(56) References Cited

U.S. PATENT DOCUMENTS 6,115,652 A * 9/2000 Sato ...................... G08G 1/22
                                                                    701/28
7,831,433 B1 * 11/2010 Belvin .................... G10L 15/18
                                                                    704/275

(Continued)

FOREIGN PATENT DOCUMENTS

CN    101793528 A    8/2010    ............ B60W 40/06
CN    103723096 A    4/2014    ............ B60R 16/02
(Continued)

OTHER PUBLICATIONS

International Search Report and Written Opinion, Application No. PCT/EP2017/064380, 10 pages, dated Sep. 27, 2017.
(Continued)

*Primary Examiner* — Richard A Goldman
(74) *Attorney, Agent, or Firm* — Slayden Grubert Beard PLLC

(57) ABSTRACT

A method, a device and a computer-readable storage medium with instructions for determining the lateral position of a vehicle relative to the lanes on a roadway. The device has an image processing unit for detecting roadway markings as well as a positioning unit for determining an initial position for the vehicle. An evaluation unit is set up to determine that the detected roadway markings are insuf-
(Continued)

ficient for detecting a lateral position of the vehicle by comparing the detected roadway markings with roadway marking information from a lane geometry map for the initial position determined for the vehicle. In this case, the evaluation unit identifies an approximate lateral position of the vehicle while taking into consideration information from the lane geometric map.

10 Claims, 6 Drawing Sheets

(52) U.S. Cl.
CPC ....... *G05D 1/0246* (2013.01); *B60W 2400/00* (2013.01); *B60W 2420/42* (2013.01); *B60W 2555/60* (2020.02); *G05D 2201/0213* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 8,577,515 | B2* | 11/2013 | Kobayashi | B60T 8/17558 701/1 |
| 8,996,197 | B2 | 3/2015 | Joh et al. | 701/1 |
| 9,151,626 | B1 | 10/2015 | Kojo | |
| 9,604,574 | B2 | 3/2017 | Jo et al. | |
| 9,672,734 | B1* | 6/2017 | Ratnasingam | G08G 1/0968 |
| 9,707,961 | B1* | 7/2017 | Halder | G05D 1/0257 |
| 9,884,645 | B2* | 2/2018 | Fujii | B60W 10/20 |
| 10,301,783 | B2 | 5/2019 | Dolinar et al. | |
| 10,943,130 | B2* | 3/2021 | Schack | B60W 30/12 |
| 2006/0145827 | A1* | 7/2006 | Kuge | B62D 6/007 340/439 |
| 2007/0091173 | A1* | 4/2007 | Kade | B62D 15/025 348/119 |
| 2008/0080740 | A1* | 4/2008 | Kaufmann | B62D 15/025 382/104 |
| 2010/0098295 | A1* | 4/2010 | Zhang | G06K 9/00798 382/103 |
| 2010/0121518 | A1* | 5/2010 | Tiernan | G01C 21/165 701/26 |
| 2010/0191421 | A1* | 7/2010 | Nilsson | B62D 6/003 701/41 |
| 2010/0191461 | A1 | 7/2010 | Zeng | 701/532 |
| 2010/0268452 | A1* | 10/2010 | Kindo | G01C 21/3658 701/533 |
| 2012/0314070 | A1 | 12/2012 | Zhang et al. | 348/148 |
| 2013/0052614 | A1 | 2/2013 | Mollicone et al. | 434/65 |
| 2013/0082874 | A1* | 4/2013 | Zhang | G08G 1/163 342/357.31 |
| 2014/0129073 | A1* | 5/2014 | Ferguson | G05D 1/00 701/23 |
| 2014/0257686 | A1 | 9/2014 | Feldman et al. | 701/300 |
| 2014/0358321 | A1* | 12/2014 | Ibrahim | G01S 19/14 701/1 |
| 2015/0045986 | A1* | 2/2015 | Kan | B60W 40/08 701/1 |
| 2015/0325127 | A1* | 11/2015 | Pandita | G08G 1/166 701/431 |
| 2016/0003636 | A1* | 1/2016 | Ng-Thow-Hing | G08G 1/167 701/26 |
| 2016/0187887 | A1 | 6/2016 | Ferguson et al. | 701/28 |
| 2017/0262712 | A1* | 9/2017 | Chundrlik, Jr. | G08G 1/166 |
| 2018/0346019 | A1* | 12/2018 | Fujii | B62D 1/286 |
| 2019/0263405 | A1* | 8/2019 | Schack | G05D 1/0246 |
| 2020/0174487 | A1* | 6/2020 | Viswanathan | G01C 21/30 |
| 2020/0207343 | A1* | 7/2020 | Vassilovski | G05D 1/0088 |

FOREIGN PATENT DOCUMENTS

| | | | | |
|---|---|---|---|---|
| CN | 105667516 | A | 6/2016 | ............ B60W 40/02 |
| DE | 102012104786 | A1 | 12/2012 | ............ B60W 30/12 |
| DE | 102014203965 | A1 | 12/2014 | ............ B60W 40/04 |
| DE | 102014211450 | A1 | 12/2014 | ............ B60W 30/12 |
| DE | 102016213782 | A1 | 2/2018 | ............ B60W 30/12 |
| DE | 102016213817 | A1 | 2/2018 | ............ B60W 30/12 |
| EP | 1686538 | A2 | 8/2006 | ............ G06T 17/05 |
| EP | 2633270 | B1 | 5/2015 | ............ G01C 21/32 |
| EP | 2878975 | A1 | 6/2015 | ............ G01S 19/40 |
| EP | 2899669 | A1 | 7/2015 | ............ G06K 9/00 |
| EP | 2918974 | A1 | 9/2015 | ............ G01C 21/36 |
| JP | 2015069287 | A | 4/2015 | ............ B06R 21/00 |
| WO | 2008/150002 | A1 | 12/2008 | ............ G06K 9/00 |
| WO | 2013/133752 | A1 | 9/2013 | ............ B60W 30/12 |
| WO | WO2013/133752 | A1 * | 12/2013 | ............ B62D 15/02 |
| WO | 2018/019464 | A1 | 2/2018 | ............ G01C 21/36 |
| WO | 2018/019465 | A1 | 2/2018 | ............ G06K 9/00 |

OTHER PUBLICATIONS

U.S. Non-Final Office Action, U.S. Appl. No. 16/320,359, 14 pages.
Chinese Office Action, Application No. 201780044340.6, 13 pages, dated Dec. 3, 2021

* cited by examiner

METHOD, DEVICE AND COMPUTER-READABLE STORAGE MEDIUM WITH INSTRUCTIONS FOR DETERMINING THE LATERAL POSITION OF A VEHICLE RELATIVE TO THE LANES ON A ROADWAY

CROSS-REFERENCE TO RELATED APPLICATIONS

This application claims priority to German Patent Application No. DE 10 2016 213 782.4, filed on Jul. 27, 2016 with the German Patent and Trademark Office. The contents of the aforesaid German Patent Application is incorporated herein in their entireties for all purposes.

TECHNICAL FIELD

The present invention relates to a method, a device and a computer-readable storage medium with instructions for determining the lateral position of a vehicle relative to the lanes of a roadway and in particular for determining a relative lateral position with sub-lane accuracy. The present invention furthermore relates to a vehicle with such a device.

BACKGROUND

Modern vehicles are becoming increasingly autonomous, i.e. the vehicles are making more and more functions and systems available to the driver, which help the driver control the vehicle using instructions or take over parts of the vehicle control. A multitude of information about the vehicle and its environment is needed for such functions and systems.

Knowledge about the lane on which the vehicle to be navigated, the "ego vehicle," is located is needed for the function "lane-exact navigation", for example. This lane is also called the "ego lane." Furthermore, in addition to knowledge about the ego lane, more exact information with respect to the transverse position of the ego vehicle relative to the ego lane is needed for automated driving and car-to-car-based applications. It must be known at all times with sub-lane accuracy where the ego vehicle is located laterally with respect to the roadway.

Reference US 2014/0358321 A1 discloses a method for detecting and tracking the boundaries of a traffic lane. The method uses maps with information on the street geometry, GPS data, historical data and the positions of other vehicles for determining the current position.

Reference EP 2 899 669 A1 describes a method for determining the lateral position of a vehicle relative to the traffic lane of a street. Geometric aspects of the traffic lanes, for example roadway markings, are detected with the help of a camera. The detected aspects are classified and help to determine the position. The classification requires training of the classification unit.

Reference DE 10 2012 104 786 A1 describes a system for the exact assessment of a lane, in which a vehicle is driving. A system for lane detection provides estimated lanes, which are determined in different manners. Examples are lane markings captured by a camera, a guide vehicle or GPS/maps, which are exact down to the lane level. The estimated lanes are provided with confidence information. The estimated lanes and the corresponding confidence information are combined to result in a detected lane.

In summary, there are currently mainly three solution approaches for determining the lateral position of a vehicle relative to a roadway.

A first approach is the use of a highly accurate calibrated digital lane geometry map with an absolute accuracy in the centimeter range in connection with a highly accurate dual-frequency GPS system. The position in the map is hereby determined with the help of the GPS sensor without further imaging sensors. However, due to GPS and map inaccuracies with respect to the absolute position, it is often not possible to assign the ego vehicle to the correct lane. Moreover, a solution with a highly accurate map and a highly accurate GPS is very cost-intensive.

Another approach is the use of imaging sensors, e.g. of a camera system. The assignment of the ego vehicle to lanes referring to lanes detected by the sensor system is hereby enabled. However, the use of imagine sensors without the simultaneous use of a digital map often leads to only one or two lanes being detected by the sensor system. The positioning of the ego vehicle can then only take place relative to the detected lane, but not relative to all lanes.

A third approach combines an imaging sensor system with map information with respect to the number and marking type of the lanes. Through the use of imaging sensors and the information from a digital map about how many lanes are present and what sort of edge markings they have (dashed, solid, etc.), the ego vehicle can be assigned to all lanes. Due to distance errors of the lane markings captured by the sensors relative to the ego vehicle, the accuracy of the transverse position with respect to the corresponding lane is insufficient for the aforementioned applications.

SUMMARY

An object exists to provide a method and a device for determining the lateral position of a vehicle relative to the lanes of a roadway, which enable a determination of the relative lateral position with sub-lane accuracy.

This object is solved according to the subject matter of the independent claims. Embodiments of the present invention are the subject matter of the dependent claims.

According to a first aspect, a method for determining a lateral position of a vehicle relative to the lanes of a roadway comprises the steps:

Detecting roadway markings;
Determining an initial position for the vehicle;
Determining that the detected roadway markings are insufficient for identifying a lateral position of the vehicle by comparing the detected roadway markings with roadway marking information from a lane geometry map for the initial position determined for the vehicle; and
Identifying an approximate lateral position of the vehicle while taking into consideration information from the lane geometry map.

According to another aspect, a device for determining a lateral position of a vehicle relative to the lanes of a roadway has:

An image-processing unit for detecting roadway markings;
A positioning unit for determining an initial position for the vehicle; and
An evaluation unit that is set up to determine that the detected roadway markings are insufficient for identifying a lateral position of the vehicle by comparing the detected roadway markings with roadway marking information from a lane geometry map for the initial position determined for the vehicle and that is set up to detect an approximate lateral position of the vehicle while taking into consideration information from the lane geometry map.

According to another aspect, a computer-readable storage medium contains instructions, which, when executed by a computer, cause the computer to execute the following steps:

Detecting roadway markings;

Determining an initial position for the vehicle;

Determining that the detected roadway markings are insufficient for identifying a lateral position of the vehicle by comparing the detected roadway markings with roadway marking information from a lane geometry map for the initial position determined for the vehicle; and Detecting an approximate lateral position of the vehicle while taking into consideration information from the lane geometry map.

BRIEF DESCRIPTION OF THE FIGURES

The invention is explained in the following using exemplary embodiments.

DETAILED DESCRIPTION

Figure 1:
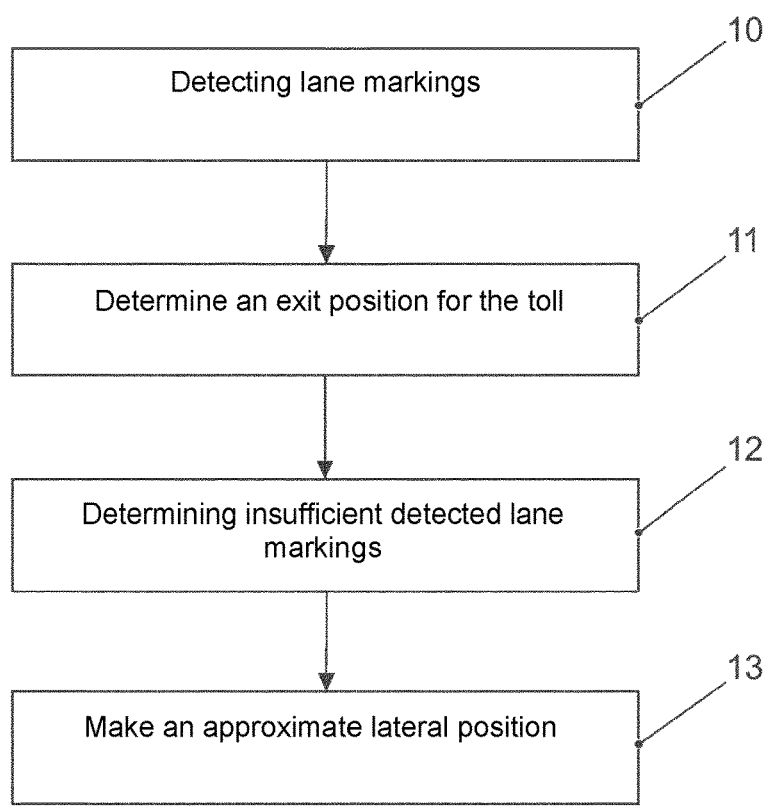
FIG. 1 shows schematically a method for determining a lateral position of a vehicle relative to the lanes of a roadway.

The sub-lane-accurate method according to one aspect for determining the lateral vehicle position with respect to the roadway is based on the comparison of roadway markings, which were identified by an imaging sensor system, with roadway marking geometries from a digital lane geometry map. This is not subject to any special requirements with respect to absolute accuracy but does contain the lane center geometries and lane edge geometries with a high accuracy with respect to each other. The lateral position of the vehicle is detected based on the comparison. In the event that the detected roadway markings for the comparison are insufficient, an approximate lateral position is determined based on the information from the lane geometry map. The information concerns in particular information on traffic lanes and/or roadway markings. The availability of detected roadway markings in sufficient number and accuracy is not always guaranteed, mainly due to the recognition accuracy of the camera systems, occasionally also due to external influences like blocking of the view of the camera by other vehicles or interruption of roadway markings due to improved roadway sections. The determination of an approximate lateral position even in the case of insufficient number and/or correctness of the available detected roadway markings make it possible to adjust a lateral position previously detected by the method over a certain period of time for the continued vehicle movement and thus to preserve a previously obtained result of the comparison over short periods of time.

According to some embodiments, the approximate lateral position of the vehicle is detected by:

Detecting that, based on the initial position, only one traffic lane is to be considered drivable according to the information from the lane geometry map; and Determining a position in the traffic lane identified as drivable as the approximate lateral position of the vehicle.

If there is only one drivable traffic lane for the vehicle, then it should be assumed with a high probability that the vehicle is located in this traffic lane. This is for example the case on single-lane streets without an oncoming lane. In such situations, the lateral position of the vehicle is adjusted so that it is located in this traffic lane. This approach provides a reliable approximate lateral position. It also has the advantage that it gets by without the use of the position from the previous comparison.

According to some embodiments, the approximate lateral position of the vehicle is detected by:

Detecting that, based on the initial position and a previously detected lateral position of the vehicle according to the information from the lane geometry map, a change to another lane is not possible; and Determining a position in the traffic lane identified by the initial position as the approximate lateral position of the vehicle.

If there are several drivable traffic lanes for the vehicle, but if a traffic lane change is not possible based on the initial position and the last detected position, then it should be assumed with a high probability that the vehicle is located in the traffic lane identified by the initial position. This is for example the case if the lane markings prohibit a lane change. This approach also provides a quite reliable approximate lateral position.

The decision whether a traffic lane is to be considered drivable or whether a change to another traffic lane is possible may in some embodiments take into consideration compliance with the traffic regulations and/or a deviation between a track angle of the vehicle and a direction angle of the traffic lane. Which driving maneuvers are considered possible and which are considered sufficiently unlikely as to consider them impossible depends greatly on the use case. A restrictive selection of potential driving maneuvers may be more necessary the longer the time segments typically last, during which insufficient information on lane markings is received from the camera system. Assumptions about complying with the traffic regulations decide for example whether such roadway markings are also considered traversable, which should not be traversable according to the traffic regulations, e.g. solid lines or shaded surfaces, or whether only structural separations are considered non-traversable. Likewise, whether traffic lanes, which are not drivable according to traffic regulations, such as the emergency lane, are considered drivable. The different assumptions about the possibility or impossibility of certain driving maneuvers may in some embodiments be configured. With respect to the angle deviation, only those lanes are considered drivable, for which the direction angle differs from the track angle of the vehicle by less than a configurable angle.

According to some embodiments, several modes are provided for determining a position in the identified traffic lane, which can be selected by means of a configuration parameter. In a first mode, the initial position may be shifted laterally to the center of the traffic lane. According to a second mode, the initial position may be shifted laterally so that the distance between the shifted position and the center of the traffic lane remains unchanged compared to the previous final position. According to a third mode, the geometry of the traffic lane may not be taken into consideration. The estimation of the vehicle movement may be based in this case exclusively on the detected initial position. The three modes allow the adjustment of the determination of the position in the identified traffic lane for the degree of vehicle integration. Thus, the third mode is then for example particularly useful when the positioning, in particular the measurement of the smooth relative movement, has a high accuracy.

According to some embodiments, the approximate lateral position of the vehicle is detected by:

Detecting traffic lanes, in which the vehicle could have continued its travel based on the previous final position;
Detecting potential positions in the identified lanes;
Assessing the identified potential positions and
Adopting the best potential position as the approximate lateral position of the vehicle.

If several potential traffic lanes are identified for the vehicle, the approximate lateral position is identified based on a multi-step method made up of determining potential vehicle positions, assessing the positions and selecting the best position. With this approach, a sufficiently reliable lateral position can often also be determined in the event that the traffic lane is not clear. The detected traffic lanes in some embodiments comprise the traffic lane belonging to the previous final position and, if applicable, its subsequent as well as the immediately adjacent traffic lanes. The most probable vehicle positions are covered with these traffic lanes.

A method according to one or more of the preceding aspects or a device according to the preceding aspects may in some embodiments be used in an autonomously or manually controlled vehicle, in particular a motor vehicle.

Further characteristics, benefits, and advantages of the present invention may become apparent from the below description of additional embodiments and the attached claims in connection with the figures.

In order to better understand the principles of the present invention, embodiments of the present aspect are explained in greater detail in the following based on the FIGS. It should be understood that the invention is not limited to these embodiments and that the described characteristics can also be combined or modified without unduly restricting the scope of protection of the invention, as it is defined in the attached claims.

FIG. 1 shows schematically a method for determining a lateral position of a vehicle relative to the lanes of a roadway. In a first step, roadway markings are detected 10. Furthermore, an initial position for the vehicle is determined 11. If it is determined 12 that the detected roadway markings are insufficient for detecting a lateral position of the vehicle by comparing the detected roadway markings with roadway marking information from a lane geometry map for the initial position determined for the vehicle, then a lateral position of the vehicle is instead detected taking into consideration information from the lane geometry map 13. The information concerns in particular information on traffic lanes and/or roadway markings. For example, it can be checked for determining the approximate lateral position whether, based on the initial position, only one traffic lane is to be considered drivable according to the information from the lane geometry map or whether a lane change is impossible. For this, in particular, compliance with the traffic regulations and/or a deviation between a track angle of the vehicle and a direction angle of the traffic lane can be taken into consideration. In these cases, the traffic lane is clearly identified and a position in the identified traffic lane can be determined as an approximate lateral position of the vehicle. If several potential traffic lanes are detected for the vehicle, the approximate lateral position can be detected based on a multi-step method made up of determining potential vehicle positions, assessing the positions and selecting the best position.

Figure 2:
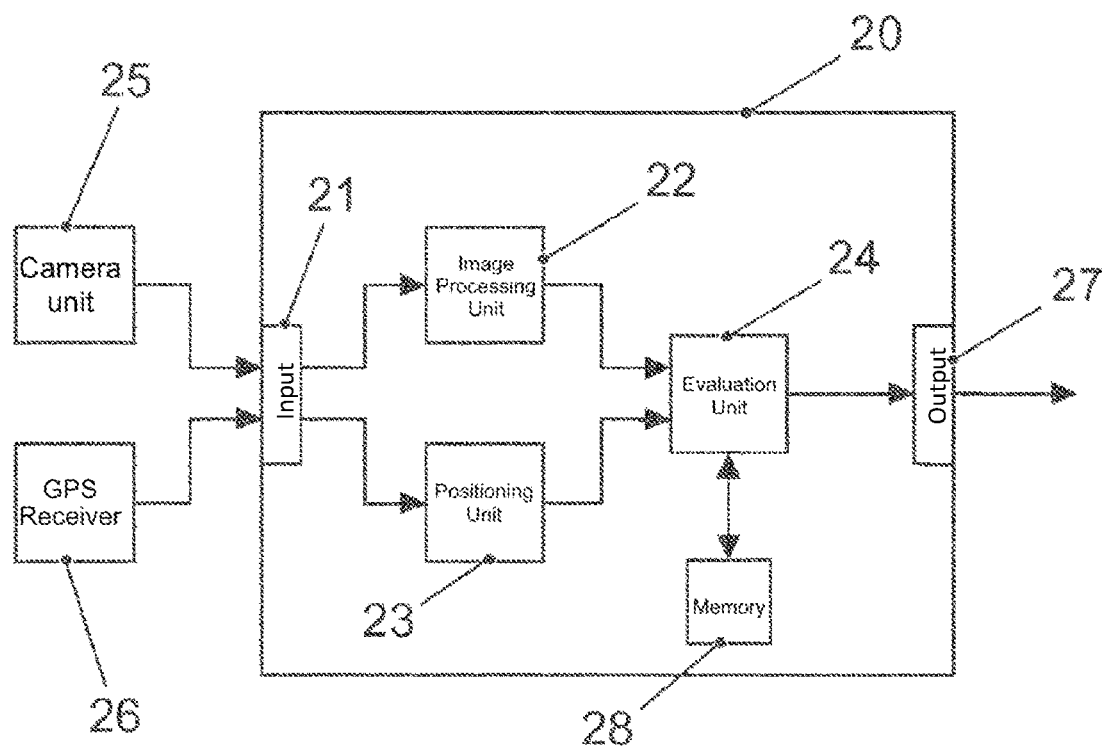
FIG. 2 shows a first exemplary embodiment of a device for determining a lateral position of a vehicle relative to the lanes of a roadway.

FIG. 2 shows a simplified schematic representation of a first embodiment of a device 20 for determining a lateral position of a vehicle relative to the lanes of a roadway. The device 20 has an image processing unit 22 for detecting 10 roadway markings. For this purpose, the image processing unit 22 uses for example image information from a camera unit 25, which is received via an input 21 of the device 20. The device 20 also has a positioning unit 23 for determining 11 an initial position for the vehicle. The initial position is determined for example based on received data from a GPS receiver 26, which can also be received via the input 21. An evaluation unit 24 is set up to determine 12 that the detected roadway markings are insufficient for detecting a lateral position of the vehicle by comparing the detected roadway markings with roadway marking information from a lane geometry map for the initial position determined for the vehicle. In this case, the evaluation unit 24 detects 13 an approximate lateral position of the vehicle while taking into consideration information from the lane geometric map, in particular taking into consideration information on traffic lanes and/or roadway markings.

For example, the evaluation unit 24 for determining the approximate lateral position can check whether, based on the initial position, only one traffic lane should be considered drivable according to the information from the lane geometry map or whether a lane change is impossible. For this, in particular, compliance with the traffic regulations and/or a deviation between a track angle of the vehicle and a direction angle of the traffic lane can be taken into consideration. In these cases, the traffic lane is clearly identified and a position in the identified traffic lane can be determined as an approximate lateral position of the vehicle. If several potential traffic lanes are identified for the vehicle, the evaluation unit 24 can identify the approximate lateral position based on a multi-step method made up of determining potential vehicle positions, assessing the positions and selecting the best position.

The lateral position of the vehicle determined by the evaluation unit 24 may be made available for further processing via an output 27 of the device 20, for example for processing in a lane guidance system. It can also be saved in a memory 28 of the device 20, for example for later assessment. The input 21 and the output 27 can be implemented as separate interfaces or as a combined bidirectional interface. The image processing unit 22, the positioning unit 23 as well as the evaluation unit 24 can be realized as dedicated hardware, for example as integrated switches. However, they can naturally also be implemented partially or completely combined or as software, which runs on a suitable processor.

Figure 3:
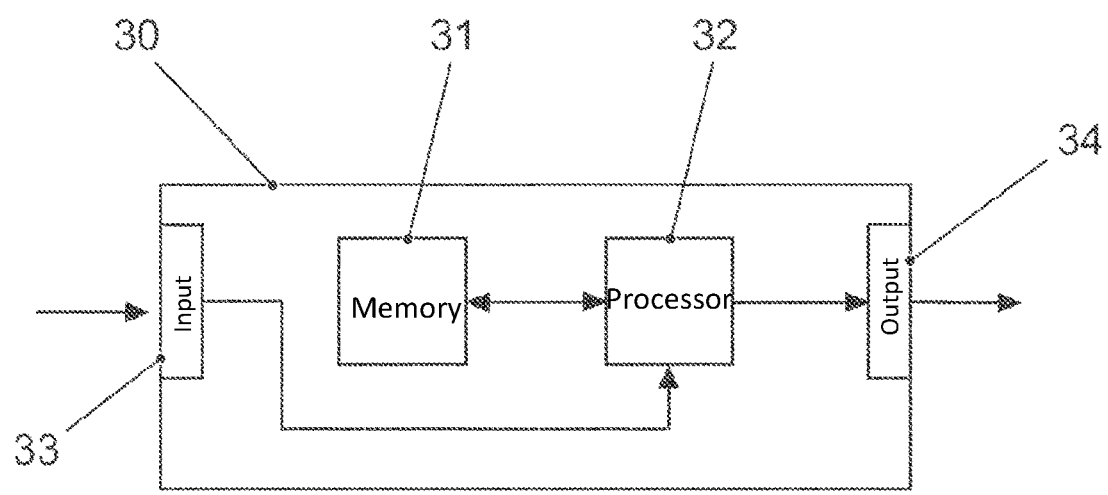
FIG. 3 shows a second exemplary embodiment of a device for determining a lateral position of a vehicle relative to the lanes of a roadway.

FIG. 3 shows a simplified schematic representation of a second embodiment of a device 30 for determining a lateral position of a vehicle relative to the lanes of a roadway. The device 30 has a processor 32 and a memory 31. For example, the device 30 can be a computer or a workstation. Instructions that cause the device 30 when executed by the processor 32 to execute the steps according to one of the described methods are saved in the memory 31. The instructions saved in the memory 31 thus represent a program that can be run by the processor 32 and that is realized by the method according to the present embodiment. The device has an input 33 for receiving information. Data generated by the processor 32 is made available via an output 34. Moreover, it can be saved in the memory 31. The input 33 and the output 34 can be combined into a bidirectional interface.

The processor 32 can comprise one or more processor units, for example microprocessors, digital signal processors or combinations thereof.

The memories 28, 31 in the described embodiments can have volatile and/or non-volatile memory areas and comprise various memory devices and memory media, for example hard drives, optical memory media or semi-conductor memories.

Another embodiment is described in detail in the following. The method is based on a series of input data. The geometry and property information of the visible roadway markings detected by the imaging sensor system are needed first. These are called BV lines below (BV stands for "Bildverarbeitung," in English—image processing). Absolute position information with direction and speed specification is also needed. This can be made available for example by the vehicle GPS. For the absolute position information, the present embodiment provides a distinction between absolute position information that represents the direct result of positioning by a GNSS system (GNSS: Global Navigation Satellite System) (GNSS position data) and information extrapolated based on a past GNSS positioning by dead reckoning (absolute position data). Relative, smooth position information, which is detected e.g. by means of movement estimation, can also be used as an option. Additionally, map data with a high relative accuracy with respect to lanes and roadway markings is used. This data is made available for example by a map data server 110. The map information is referred to below as DLM lanes (DLM: Detailed Lane Model) and DLM lane markings. Results from the previous cycle(s) of the method may be optionally included as history, except naturally in the first iteration.

Figure 4:
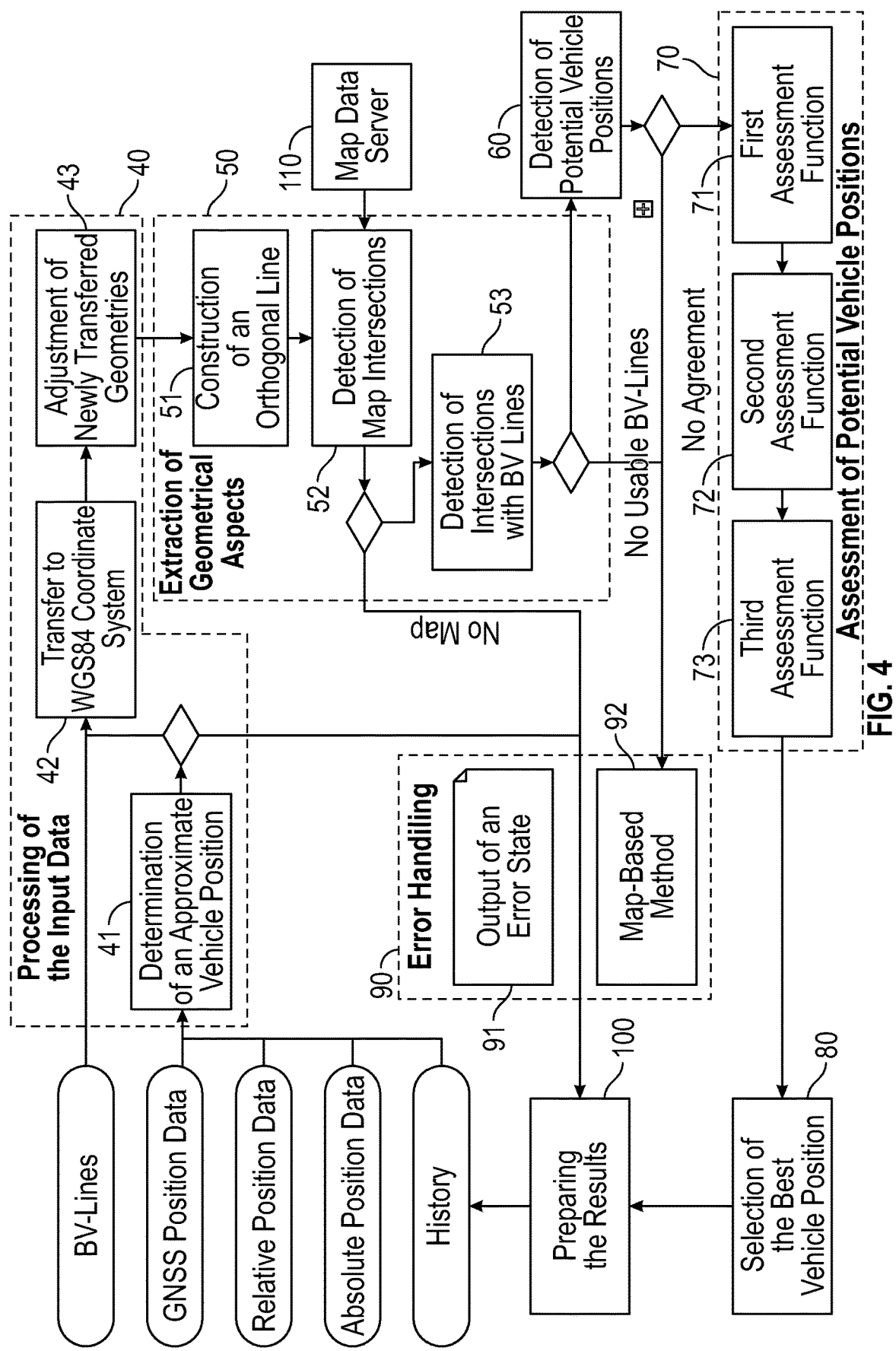
FIG. 4 shows an exemplary design of the method shown in FIG. 1.

The principle flow of the method is divided into several parts, which are partially summarized in dashed blocks in FIG. 4.

Within the framework of a processing 40 of the input data, an approximate vehicle position is determined 41. This serves as a starting point for the comparison of roadway markings with map data. A conversion and aggregation of the geometries of the BV lines also takes place.

The geometries of the roadway markings detected by the camera system are typically described by clothoids in a vehicle-relevant, Cartesian coordinate system. The clothoid descriptions are converted into polylines, which replicate the clothoid geometries in good approximation. The conversion into polylines is performed since the algorithms subsequently operating on the roadway marking geometries are thus much easier to implement. In the present embodiment, the coordinates of the polylines from the vehicle-relative, Cartesian coordinate system are transferred to the WGS84 coordinate system 42. The subsequent algorithms operate in the WGS84 coordinate system since the map data and the vehicle position and movement information are also typically present in this coordinate system.

The geometries of the roadway markings recognized by the camera system always begin right in front of the vehicle and have an expansion of a few meters approximately in the driving direction/camera viewing direction. Roadway markings are initially occasionally recognized and transmitted correctly by the camera system, but are no longer detected shortly thereafter. The BV lines present in an algorithm iteration are thus always buffered and compared with the geometries newly transmitted by the camera system during the next iteration 43.

Significant geometry aspects are subsequently extracted 50. Points of BV lines and DLM lane markings are hereby calculated for the longitudinal vehicle position. For this, an orthogonal line of a configurable length is first constructed at a configurable distance from the approximate vehicle position 51. Intersections of the DLM lane markings and the DLM lanes with the orthogonal path are then detected 52, separated by intersections with the DLM lane markings (marking intersection) and intersections with the DLM lanes (lane intersection). For each intersection, its lateral position relative to the vehicle, e.g. as a distance from the center point of the orthogonal path, and, in the case of DLM lane markings, the information on the type of associated roadway marking (dashed/solid line, guardrail, roadway edge, . . . ) may optionally be retained. In a further step, the intersections of the orthogonal path are formed with the BV lines 53. In turn, its lateral position relative to the vehicle and the information on the type of detected roadway marking (dashed/solid line, guardrail, roadway edge, . . . ) may optionally be retained for each intersection.

A number of potential vehicle positions is detected based on the results of the previous step 60. These are then assessed by a sequence of corresponding assessment functions 70, wherein the potential vehicle positions are enhanced or modified, if applicable. Penalty points are assigned with the help of the assessment functions. A first assessment function 71 considers the assignment of the line types captured by the camera for the line types saved in the map. The configurable matrix already described further above, which assigns a specific value for each combination of BV line and map roadway marking type, may optionally be used for this assessment. A second assessment function 72 considers the history of the vehicle positions. Potential vehicle positions, which deviate greatly from the history, are characterized for example by high penalty points. In the present embodiment, a third assessment function 73 assesses the lane type. The vehicle is presumed to be in a regular traffic lane on the roadway. Potential vehicle positions in traffic lanes that are not intended for driving (shoulders, "unknown traffic lanes" of the DLM and emergency lanes, . . . ) are thus assessed poorly; potential vehicle positions in drivable traffic lanes are assessed neutrally. Another example is that considerably higher penalty points are given for potential vehicle positions in the oncoming lane than for positions in the driving direction. The allocation of the penalty points depends on the sensor system and digital map that are used. A correct adjustment for the systems used can thus take place very easily. As a result of the assessment process, the best possible vehicle position is ultimately selected 80, the so-called final position.

During this process, it can occur at various locations that a positioning is not possible and the process cannot continue due to a lack of input data or an insufficient quality of the input data. In such cases, it is provided to abandon the modular flow at the corresponding location and to initiate error handling 90. In FIG. 4, the paths of the regular flow are shown by the solid arrows and the paths in the case of a deviation from the regular flow are shown by the dashed arrows. For example, in the event of the unavailability of map data for the current vehicle position according to absolute position information, a detection of the potential vehicle positions is not performed. In the event of the absence of absolute position information (e.g. no GNSS reception through buildings), the absolute position information can be replaced by earlier absolute position information and relative position information if relative position information is available. If relative position information is not available, potential vehicle positions are not detected in the event of the absence of absolute position information. In such cases, a corresponding error state is output 91.

The method described above for determining the vehicle position can also only be performed if the camera system has correctly recognized a sufficient number of roadway markings and if a corresponding number of BV lines matching the DLM markings is available. If too few BV lines are recognized or if an insufficiently good assignment of DLM lane markings to BV lines is found, the regular method fails.

The availability of BV lines in sufficient number and accuracy is not always guaranteed, mainly due to the recognition accuracy of the camera systems, occasionally also due to external influences such as blocking of the view of the camera by other vehicles or interruption of roadway markings due to improved roadway sections.

As explained further above, the assessments of the potential positions are more reliable if position information from the past iteration is available for an iteration. The method thus provides mechanisms 92, even in the case of an insufficient number and/or correctness of the available BV lines, for adjusting a position previously detected by the method over a certain period of time for the continued vehicle movement and thus for preserving a previously obtained result over short periods of lapses in sufficient information on BV lines. The mechanisms used are described below.

Since the mechanisms are based on estimating the further movement of the final position of the previous iteration, the quality estimation of the currently generated final position is also based on the quality estimation of the previous final position. In general, the value of the quality estimation is adjusted with each iteration of one of the methods described here such that the expected reliability worsens according to the deviations to be expected with proceeding iterations. The decline in the quality estimation is configurable and can be adjusted for the expected deviations in the respective vehicle integration. Thus, aspects like the accuracy and the functional range of the GNSS system used, the availability and accuracy of (smooth) relative movement information, the availability, accuracy and reliability of sensor fusion method, etc. can be taken into consideration. If the detected quality value falls below a configurable threshold value, then the comparison fails.

It can be detected in certain situations that the vehicle can only be located in exactly one DLM lane so that the final position is thus clear. In these situations, the lateral position of the vehicle is adjusted so that it is located in this lane.

Whether such a situation happens depends among other things on assumptions about which lanes are drivable and reachable for the vehicle. It is thus significant for example in the case of highway on- and off-ramps with exactly one traffic lane as well as an emergency lane whether driving in the emergency lane is considered possible or respectively probable. If driving in the emergency lane is considered impossible, then it is clear that the vehicle is located in the traffic lane and a final position can be determined, otherwise not.

Which driving maneuvers are considered possible and which are considered sufficiently unlikely as to consider them impossible depends greatly on the use case. A restrictive selection of potential driving maneuvers is more necessary the longer the time segments typically last, during which insufficient information on BV lines is received from the camera system and the faster the quality estimation drops in the case of iterations with the method described further below for the positioning based on the estimation of further vehicle movement. The speed of the drop in the quality estimation is great above all if the expected deviations in the position information used are great, so that for example the use exclusively of a GNSS system with average accuracy can make a more restrictive configuration of potential driving maneuvers necessary; in contrast, the integration of smooth, relative position information permits a considerably greater tolerance of potential driving maneuvers.

Different assumptions about the possibility and impossibility of certain driving maneuvers may optionally be configured. For example, it can be determined by means of a parameter whether the traffic regulations should be taken into consideration. This parameter decides whether such roadway markings are also considered traversable, which should not be traversable according to the traffic regulations, e.g. solid lines or shaded surfaces, or whether only structural separations should be considered non-traversable. This parameter also decides whether traffic lanes like the emergency lane, which should not be drivable as per traffic regulations, are considered drivable. Another option is determining an angle difference. A roadway is only considered drivable if its driving direction differs from the track angle of the vehicle by less than the angle configured here.

In the case of a successful determination of a final position in a clear case, the quality value of the final position of the previous iteration may optionally be adopted for the generated final position.

Final Position for Only One Drivable Traffic Lane in the Environment

This is the only method for determining a final position in the case of insufficient BV lines, which can be used without using the position from the previous iteration.

Analogous to determining the map intersections, a path is constructed orthogonally to the current vehicle movement at the longitudinal position of the current initial position and corresponding map intersections are determined.

If there is exactly one intersection with a DLM lane on the orthogonal path, which can be driven according to the configured assumptions about the options for driving in certain lanes, then the lateral position of the vehicle is adjusted so that it is located in this DLM lane. Otherwise, it is subsequently attempted, if position information from the previous iteration is available, to achieve a result with one of the other methods for positioning in the case of insufficient BV lines.

Figure 5:
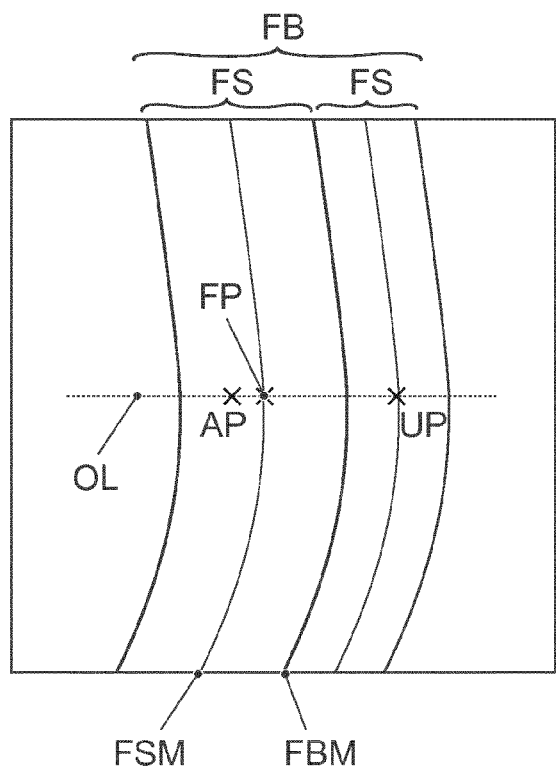
FIG. 5 shows as an example a positioning in the case of only one drivable lane.

FIG. 5 shows as an example a positioning in the case of only one drivable DLM lane in the environment. A roadway FB with two traffic lanes FS, which are delimited from each other by roadway markings FBM, as well as the associated traffic lane centers FSM are shown. The left traffic lane is a regular traffic lane; the right lane is an emergency lane. The initial position AP, i.e. the approximate vehicle position, and the constructed orthogonal line OL are also shown. The orthogonal line OL in this example only crosses two traffic lanes, wherein the emergency lane must not be drivable according to traffic regulations and is assessed as impossibly drivable according to the configuration assumed in the example. The intersection UP with the emergency lane is thus an impossible vehicle position. The only possible vehicle position is thus the intersection FP with the left traffic lane. If driving in the emergency lane were not specified as impossible by the configuration, then there would be two possible traffic lanes here and a positioning based on only one drivable DLM lane in the environment could not be performed.

Final Position in the Case of an Impossible Traffic Lane Change

This approach examines whether a change in the traffic lane since the last known position can have happened. It requires a position from the previous iteration as the initial position and is described below based on FIG. 6 and FIG. 7.

Analogous to determining the map intersections, a path is constructed orthogonally to the averaged vehicle movement between the previous and the current iteration and at a longitudinal position between the final position of the previous iteration and the current initial position. The corresponding map intersections are determined based on this path.

The lane intersection best corresponding with the current initial position is detected first. It is then checked whether a neighboring lane intersection can be achieved from this intersection. For this, the closest intersections to the left and right based on the intersection belonging to the initial position are considered and checked:

- If it is a marking intersection, which can be driven over according to the assumptions about the potential driving maneuvers, then the check is continued in this direction with the next marking intersection.
- If it is a marking intersection, which cannot be driven over according to the assumptions about the potential driving maneuvers, then the check is ended in this direction with the result that a traffic lane change in this direction is not possible.
- If it is a lane intersection, which can be driven on according to the assumptions about the potential driving maneuvers, then the check is ended in this direction with the result that a traffic lane change in this direction is possible.
- If it is a lane intersection, which cannot be driven on according to the assumptions about the potential driving maneuvers, then the check is ended in this direction with the result that a traffic lane change in this direction is not possible.
- If there is no further intersection in this direction, then the check in this direction is ended with the result that a traffic lane change in this direction is not possible.

If the checks show that a traffic lane change in both directions is not possible, then the lateral position of the vehicle is adjusted such that it is located in the DLM lane identified with the initial position.

Figure 6:
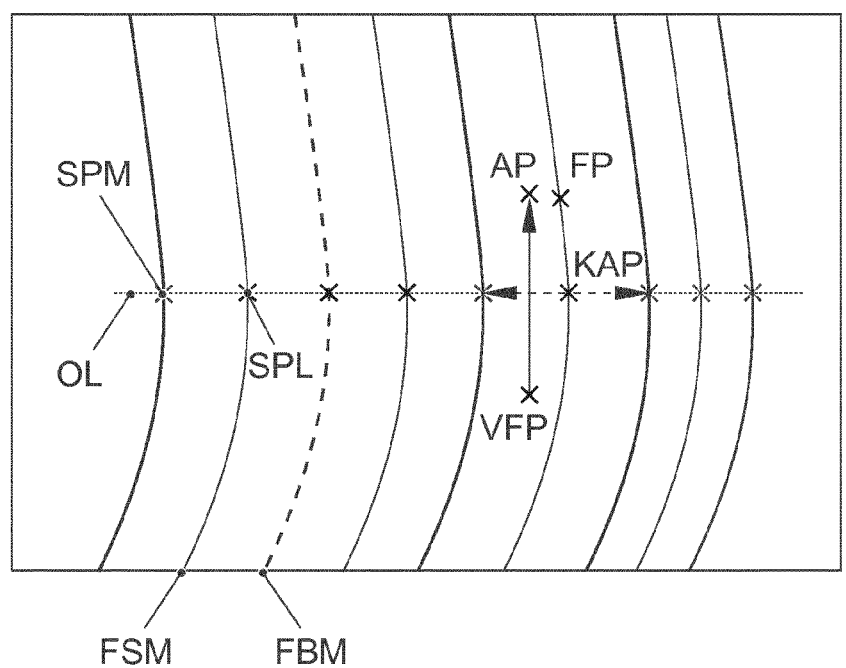
FIG. 6 shows an example of a situation in which a lane change is not possible.

FIG. 6 shows as an example a situation, in which departure from the DLM lane to the left or right is impossible. A roadway with four traffic lanes, which are delimited from each other by roadway markings FBM, as well as the associated traffic lane centers FSM, is shown. The traffic lane on the far right is an emergency lane. The initial position AP, the last known vehicle position VFP, i.e. the final position of the previous iteration, the orthogonal line OL constructed for smooth movement and the map intersections, separated by intersections SPM with the DLM lane markings and the intersections SPL with the DLM lanes are also shown. Traversable map intersections are marked with solid lines; non-traversable map intersections with dashed lines. The map intersection KAP belonging to the initial position AP is located in a DLM lane, which is delimited on both sides by solid lines that must not be traversed according to traffic regulations. It is thus detected in FIG. 6 that a departure from the traffic lane to the left or right is impossible, which is symbolized by the dashed arrows. Accordingly, a clear vehicle position FP can be determined.

Figure 7:
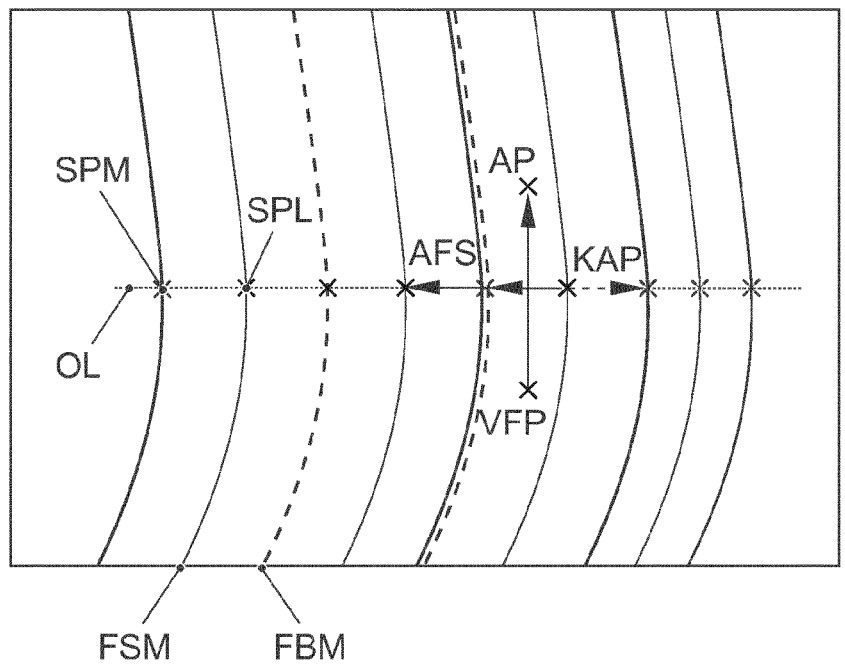
FIG. 7 shows a situation in which a lane change is possible.

In contrast, FIG. 7 shows as an example a situation in which another DLM lane is detected to which the vehicle can switch. According to the detected initial position, the vehicle is located in a DLM lane, which is delimited on the right by a solid line, in contrast on the left by a lane delimiter on one side (solid and dashed double line), which may be traversed. Thus, a lane change to the left to an alternative traffic lane AFS could have taken place, which is symbolized by the solid arrows. The drivable DLM lane is thus no longer clear and a result cannot be found with the described method. It is thus attempted to come to a result with one of the alternative methods described below.

In addition to the information on the roadway markings, additional information can also be processed during the check about whether a traffic lane change is possible. For example, a traffic lane change can also be impossible without the presence of a solid line if a no passing zone is displayed on an appropriate traffic sign. It thus makes sense to also use existing information on traffic signs, e.g. from available navigation data or from the results of an automatic traffic sign recognition.

Estimation of Further Vehicle Movement

As described above, after a traffic lane in which the vehicle is probably located is detected, the lateral position in this traffic lane is determined. For this purpose, three modes are beneficially provided, which can be selected via configuration parameters according to the vehicle integration.

In a first mode "positioning in DLM lane," the initial position is shifted laterally to the center of the DLM lane. The shifted position is output as the final position.

In a second mode "positioning along DLM lane," the initial position is shifted laterally so that the distance between the shifted position and the center of the DLM lane remains unchanged compared to the previous final position. The shifted position is output as the final position.

In a third mode "ignoring the lane geometries," the lane geometries are not taken into consideration; the estimation of the vehicle movement is based exclusively on the detected initial position. For this, the position detected in the previous pass is used and moved further by the estimated vehicle movement. This mode can be used if the positioning, in particular the measurement of the smooth relative movement, has a high accuracy.

Assessment of Potential Further Positions

Figure 8:
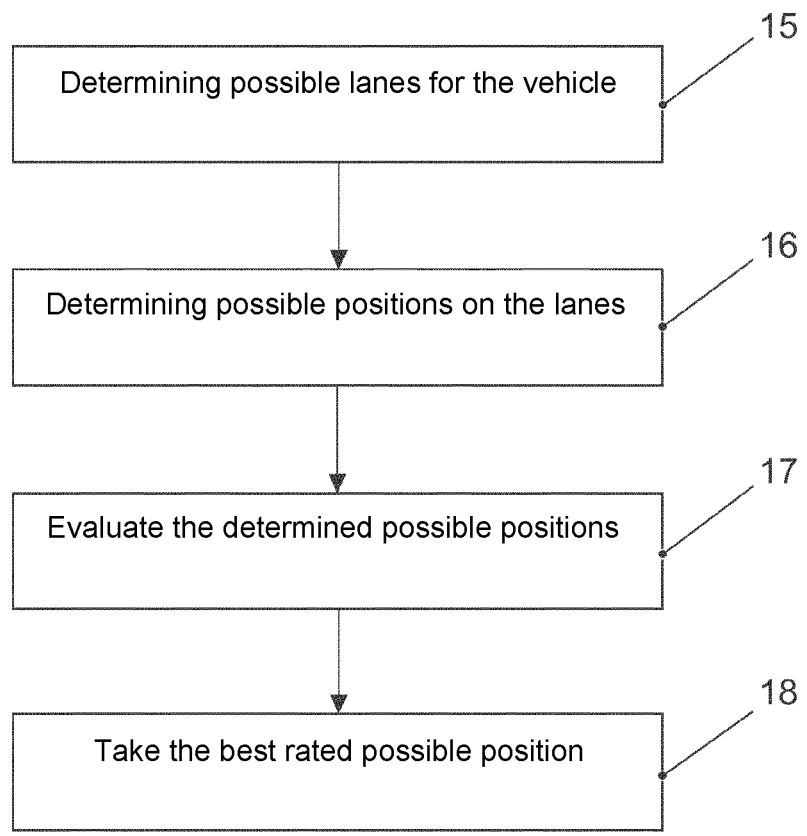
FIG. 8 shows schematically a method for determining an approximate lateral position based on the assessment of potential positions further down the road.

The methods described above for determining the lateral position in the case of insufficient BV lines can generally be structured analogously to the procedure for comparing the BV lines with the lane geometry map. The determination of the lateral position thus takes place in a two-step process made up of determining potential vehicle positions, assessing the positions and selecting the best position. This is shown schematically in FIG. 8.

All traffic lanes for the previous final position, along which the vehicle could have continued its drive, are first determined 15. These are in particular the traffic lane belonging to the last detected final position and, if applicable, its subsequent lanes, but also the directly adjacent traffic lanes. Subsequent lanes are those traffic lanes that continue a given traffic lane in the driving direction. In the transition from one single traffic lane to two traffic lanes, these two traffic lanes are subsequent lanes of the single traffic lane. The longitudinal movement of the vehicle is determined based on the position information. The path covered in the time since the previous positioning according to the longitudinal movement is cleared based on the previously determined position along the potential routes. The respective end points are recorded as potential positions 16.

An assessment 17 of the detected potential positions subsequently takes place. The best potential position is finally adopted as the approximate lateral position of the vehicle 18. A first assessment criterion can thereby be the equivalence of the relative movement as per the position information. The position according to the previous positioning is continued according to the relative movement resulting from the position information. The detected potential positions are better assessed the closer they lie to this continued previous position.

The potential positions are enhanced by new potential positions, which lie between an existing potential position and the continued previous position. The new potential positions are thereby weighted closer to the position with the respective better assessment according to the assessment of the previous position and the assessment of the existing potential positions.

A second assessment criterion can be the distance to the new position information. Potential positions with a short distance to the current position information are assessed positively.

Regardless of the manner in which the final lateral position or respectively the approximate lateral position was detected, the results are prepared in a final step 100, made available for further processing and transferred to the history.

REFERENCE LIST

10 Detection of roadway markings
11 Determination of an initial position for the vehicle
12 Determination of insufficiently detected roadway markings
13 Detection of an approximate lateral position
15 Detection of potential lanes for the vehicle
16 Detection of potential positions in the lanes
17 Assessment of the detected potential positions
18 Adoption of the best potential position
20 Device
21 Input
22 Image processing unit
23 Positioning unit
24 Evaluation unit
25 Camera unit
26 GPS receiver
27 Output
28 Memory
30 Device
31 Memory
32 Processor
33 Input
34 Output
40 Processing of the input data
41 Determination of an approximate vehicle position
42 Transfer to WGS84 coordinate system
43 Adjustment of newly transferred geometries
50 Extraction of geometrical aspects
51 Construction of an orthogonal line
52 Detection of map intersections
53 Detection of intersections with BV lines
60 Detection of potential vehicle positions
70 Assessment of potential vehicle positions
71 First assessment function
72 Second assessment function
73 Third assessment function
80 Selection of the best vehicle position
90 Error handling
91 Output of an error state
92 Map-based method
100 Preparing the results
110 Map data server
FB Roadway
FS Traffic lane
FSM Traffic lane center
FBM Roadway marking
OL Orthogonal line
AP Initial position
FP Vehicle position
UP Impossible vehicle position
SPM Marking intersection
SPL Lane intersection
VFP Last known vehicle position
KAP Map intersection belonging to initial position
AFS Alternative lane The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for determining a lateral position of a vehicle relative to the lanes on a roadway, comprising:
    detecting roadway markings by an image processor;
    determining an initial position for the vehicle by a GNSS or GPS receiver;
    determining that the detected roadway markings are insufficient for detecting a lateral position of the vehicle by comparing the detected roadway markings with roadway marking information from a lane geometry map for the initial position determined for the vehicle; and
    detecting an approximate lateral position of the vehicle while taking into consideration information from the lane geometry map.

2. The method according to claim 1, wherein the roadway marking information from the lane geometry map is information on traffic lanes and/or roadway markings.

3. The method according to claim 2, comprising:
    based on the initial position, detecting that only one traffic lane is considered drivable according to the roadway marking information from the lane geometry map;
    determining a position in the traffic lane identified as drivable as the approximate lateral position of the vehicle.

4. The method according to claim 2, comprising:
    based on the initial position and a previously detected lateral position of the vehicle according to the roadway marking information from the lane geometry map, detecting that a change to another traffic lane is not possible;

determining a position in a traffic lane identified by the initial position as the approximate lateral position of the vehicle.

5. The method according to claim 3, wherein at least a first mode, a second mode, and a third mode are provided for determining a position in an identified traffic lane, which modes are selectable by a configuration parameter; wherein in the first mode, the determined initial position is shifted laterally to a center of the traffic lane;

in the second mode, the determined initial position is shifted laterally such that a distance between a shifted position and a center of the traffic lane remains unchanged compared to a previous, final position; and in the third mode, a geometry of the traffic lane is not taken into consideration and an estimation of a vehicle movement is based exclusively on the detected initial position.

6. The method according to claim 4, wherein at least a first mode, a second mode, and a third mode are provided for determining a position in an identified traffic lane, which modes are selectable by a configuration parameter; wherein in the first mode, the determined initial position is shifted laterally to a center of the traffic lane;

in the second mode, the determined initial position is shifted laterally such that a distance between a shifted position and a center of the traffic lane remains unchanged compared to a previous, final position; and in the third mode, a geometry of the traffic lane is not taken into consideration and an estimation of a vehicle movement is based exclusively on the detected initial position.

7. A device for determining a lateral position of a vehicle relative to the lanes on a roadway, comprising:

an image processor for detecting roadway markings; and a positioning circuit with a GNSS or GPS receiver for determining an initial position for the vehicle; wherein an evaluation circuit is configured to determine that the detected roadway markings are insufficient for detecting a lateral position of the vehicle by comparing the detected roadway markings with roadway marking information from a lane geometry map for the initial position determined for the vehicle, wherein the evaluation unit is further configured to detect an approximate lateral position of the vehicle while taking into consideration information from the lane geometry map.

8. A non-transitory computer-readable storage medium comprising instructions, which instructions cause a computer to:

detect roadway markings;

determine an initial position for the vehicle;

determine that the detected roadway markings are insufficient for detecting a lateral position of the vehicle by comparing the detected roadway markings with roadway marking information from a lane geometry map for the initial position determined for the vehicle; and detecting an approximate lateral position of the vehicle while taking into consideration information from the lane geometry map.

9. An autonomously or manually controlled vehicle, comprising a device according to claim 7.

10. An autonomously or manually controlled vehicle, configured to execute the method according to claim 1.

* * * * *